United States Patent [19]

Alberts

[11] Patent Number: 5,758,433

[45] Date of Patent: Jun. 2, 1998

[54] COUNTERSINK DEPTH GAUGE

[75] Inventor: Daniel G. Alberts, Renton, Wash.

[73] Assignee: The Boeing Company, Seattle, Wash.

[21] Appl. No.: 636,771

[22] Filed: Apr. 23, 1996

[51] Int. Cl.[6] .................................................. G01B 3/28
[52] U.S. Cl. ................................. 33/836; 33/542; 33/572
[58] Field of Search ........................... 33/832, 833, 836, 33/531, 534, 542, 543, 542.1, 572

[56] References Cited

U.S. PATENT DOCUMENTS

| | | | |
|---|---|---|---|
| 1,966,618 | 7/1934 | Egorenkov | 33/836 |
| 2,401,566 | 6/1946 | Horton | 33/836 |
| 2,758,382 | 8/1956 | Hurd | 33/836 |
| 2,975,524 | 3/1961 | Field | 33/542 |
| 3,114,978 | 12/1963 | Porter | 33/542 |
| 3,116,560 | 1/1964 | Matthews | 33/542 |
| 3,195,237 | 7/1965 | Aldeborgh | 33/836 |
| 4,219,936 | 9/1980 | Bridges | 33/832 |
| 4,630,377 | 12/1986 | Schneider et al. | 33/543 |
| 4,905,378 | 3/1990 | Culver et al. | 33/836 |

FOREIGN PATENT DOCUMENTS

| | | | |
|---|---|---|---|
| 379075 | 3/1940 | Italy | 33/836 |
| 4012214 | 1/1992 | Japan | 33/542 |
| 257039 | 11/1969 | U.S.S.R. | 33/836 |
| 706676 | 12/1979 | U.S.S.R. | 33/836 |
| 1370440 | 1/1988 | U.S.S.R. | 33/542 |
| 1583725 | 8/1990 | U.S.S.R. | 33/836 |

*Primary Examiner*—Thomas B. Will
*Attorney, Agent, or Firm*—Lawrence W. Nelson

[57] ABSTRACT

A depth gauge used to measure a countersink of a hole drilled into a surface that is not orthogonal to the hole. The depth gauge includes a displacement indicator and an alignment device. The displacement indicator includes a main body and a displaceable member. The alignment device includes an extension member coupled to the displaceable member of the displacement indicator. The extension member is sized to extend along a radial axis of the displaceable member and has a diameter that is approximately the diameter of the hole to ensure alignment between a centerline of the hole and a centerline of the displaceable member. The alignment device also includes a swivel assembly having a fixed portion coupled to the main body of the displacement indicator and a base in rotational engagement with the fixed portion to ensure that the displaceable member is properly displaced with respect to the surface.

8 Claims, 6 Drawing Sheets

5,758,433

1

COUNTERSINK DEPTH GAUGE

BACKGROUND OF THE INVENTION

1. Field of the Invention

The present invention relates to an apparatus for measuring depth of a countersink, and more particularly to an apparatus for assisting in the measurement of the depth of a countersink which is not perpendicular to a surface in which it is formed.

2. Background Information

In many industrial applications, precise countersunk holes must be drilled into a variety of surfaces. The holes as well as their respective countersinks are required to have a particular depth and a precise inner dimension, and are often formed normal to a planar surface. In order to inspect and measure a countersink when it is normal to a surface, a standard countersink depth gauge can be utilized, as is well known in the art. However, when the countersink is not normal to the surface, a standard countersink depth gauge cannot be used to precisely measure the depth of the countersink.

Often, critical airplane components, which require precise inspection, such as elevator trailing edges and ailerons, have holes and countersinks drilled at nonperpendicular angles into their surfaces. For example, as shown in FIG. 1A, a hole 100 drilled into an airplane elevator (not shown) has a countersink 102a which is formed at an angle that is not normal to a surface 104 of the elevator. The standard method of determining the depth (d) of the countersink 102a is by measuring along the center line of the hole 100 from an intersection point 106a, which passes through the surface 104 to a base point 108a that is located at a countersink base, as shown in FIG. 1A.

On occasion, a critical component will incorporate a countersink and hole that are not axially aligned, as shown in FIG. 1B. This is caused by inaccurately positioned countersink drilling tools (not shown). Here, not only does the hole 100 have a countersink 102b that is not normal to the surface 104, but the countersink 102b is also not in axial alignment with the hole 100. Typically, the depth (d) of the countersink 102b is measured along the centerline of the hole 100 from an intersection point 106b, which passes through the surface 104 to a base point 108b that is located along the centerline at a height that is determined by the highest point 110 of the base of the countersink 102b. The highest point 110 of the base of the countersink 102b is the lowest possible point that a fastener 112, as shown in FIG. 2a, can be drawn into the hole 100. A head 114 of the fastener 112, which is typically a rivet, usually deforms to match the countersink angle. It would be advantageous to measure the depth of the countersink 102a, which is in axial alignment with the hole 100, and the depth of the countersink 102b, which is not in axial alignment with the hole 100, with the same measuring instrument.

Presently, as shown in FIG. 2a, the depth (d) of the countersink 102a, which is not normal to the surface 104, is measured by inserting the fastener 112 in the hole 100. Then, the distance from a top of the head 114 of the fastener 112 to the surface 104 is determined with hand held calipers 116. The calipers 116 typically have a gauge 115, which indicate the amount (h1) that protrusion 117 extends out from the base of the calipers 116, as shown in FIG. 2b. Then, the height (h2) of the fastener head 114 is measured by a clamp portion 120 of the calipers 116. Finally, the measured distance (h1) is added to the measured fastener head height (h2) to determine the depth (d) of the countersink 102a.

2

Unfortunately, variations in the positioning of the calipers 116, variations in height and seating of the fastener head 114, errors in the measured head height (h2), and angular variations caused by visually aligning the calipers 116 with the surface 104, all contribute to erroneous measurements. Further, it is inconvenient to perform a measurement on the hole 100 while the fastener 112 is located in the hole 100, and the position of the fastener 112 in the hole 100 makes it nearly impossible to determine the base point 108b used to measure the depth when the countersink 102b is not axially aligned with the hole 100.

For the forgoing reasons, a countersink depth measuring device is needed that accurately determines the centerline of the hole 100, the position where the centerline of the hole 100 intersects the surface 104, and the highest point 110 of the base of the countersinks 102a or 102b. Further, there is a need for a countersink depth measuring device that will minimize or eliminate errors that occur with the above method of measuring the depth of a countersink that is not normal to its surface. For example, a depth measuring device is needed that will minimize errors due to axial variations between the hole 100 and the countersink 102b, poor alignment with the surface 104, or poor measurement of the fastener head 114, or the distance between the top of the head 114 and the surface 104.

SUMMARY OF THE INVENTION

In accordance with one aspect of the invention, an alignment device is used to align a displacement indicator, which has a main body and a displaceable member, with a countersink of a hole drilled into a surface that is not orthogonal to the hole. The alignment device includes an extension member coupled to the displaceable member of the displacement indicator. Further, the extension member is sized to extend along a longitudinal axis of the displaceable member and to align a centerline of the hole with a centerline of the displaceable member. The alignment device also includes a swivel assembly having a fixed portion coupled to the main body of the displacement indicator and a base in rotational engagement with the fixed portion to ensure that the displaceable member is properly displaced with respect to the surface.

In accordance with another aspect of the invention, a method of measuring depth of a countersink in a hole, which is drilled into a surface at an angle that is not normal to the surface, is performed with a displacement indicator. The displacement indicator includes a displaceable member attached to an extension member. The extension member has an insert section with a diameter less than a diameter of the hole and a shoulder section with a diameter greater than a diameter of the hole. The displacement indicator is mounted on a swivel assembly having a fixed portion and a base. The method includes the steps of inserting the insert section of the extension member into the hole until the shoulder section makes contact with a base of the countersink to align a centerline of the hole with a centerline of the displaceable member, and rotating the swivel assembly to align a base with the surface. The method also includes the step of compressing the displacement member until the base makes complete contact with the surface to ensure that a distance of compression of the displaceable member equals a distance between the base of the countersink and the surface measured along the centerline of the hole.

In accordance with yet another aspect of the invention, an apparatus measures a countersink in a hole that is drilled into a surface at an angle that is not normal to the surface. The apparatus comprises an extension pin including an insert section having a diameter less than a diameter of the hole. The diameter of the insert section closely approximates the diameter of the hole. The extension pin also includes a shoulder section contiguous with the insert section at a transition edge. The shoulder section has a diameter greater than the diameter of the hole and less than the diameter of a base of the countersink. The transition edge is chamfered at an angle equal to an angle of the countersink. The extension pin further includes an engagement section having an end contiguous with the shoulder section and a threaded end opposite the end contiguous with the shoulder section. The apparatus also comprises a displacement indicator including a quill having a first end with a threaded orifice for coupling with the threaded end of the shoulder section, and a second end. The displacement indicator also includes a stem having a diameter larger than a diameter of the quill. The stem receives and slideably engages with the second end of the quill. The displacement indicator further includes an indicator head coupled to the stem and having a display indicative of an amount of displacement of the quill into the stem. The apparatus further comprises a bearing assembly including a bearing mount removably coupled to and alignable with the stem of the displacement indicator. The bearing assembly also includes a spherical bearing having a spherical section and a concave section rotatably engageable with the spherical section. The spherical section of the spherical bearing is coupled to the bearing mount. The bearing assembly further includes an annular stand, each having a bottom end and an inner side. The inner side of the annular stand is coupled to the concave section of the spherical bearing. Finally, the apparatus includes a finger piece coupled to the bearing assembly, and contoured to allow a user to position the bottom end of each of the pair of offsets on the surface.

BRIEF DESCRIPTION OF THE DRAWING(S)

DESCRIPTION OF THE PREFERRED EMBODIMENTS

Figure 3:
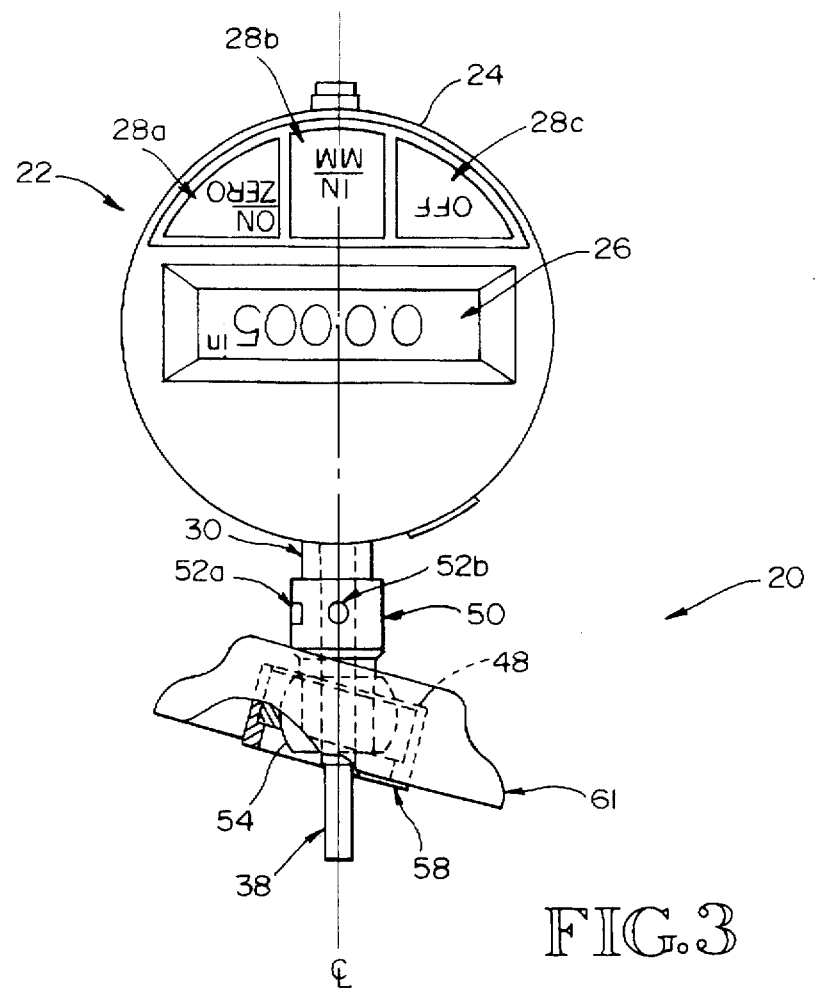
FIG. 3 is a plan view of a countersink depth gauge of the present invention.
Figure 4:
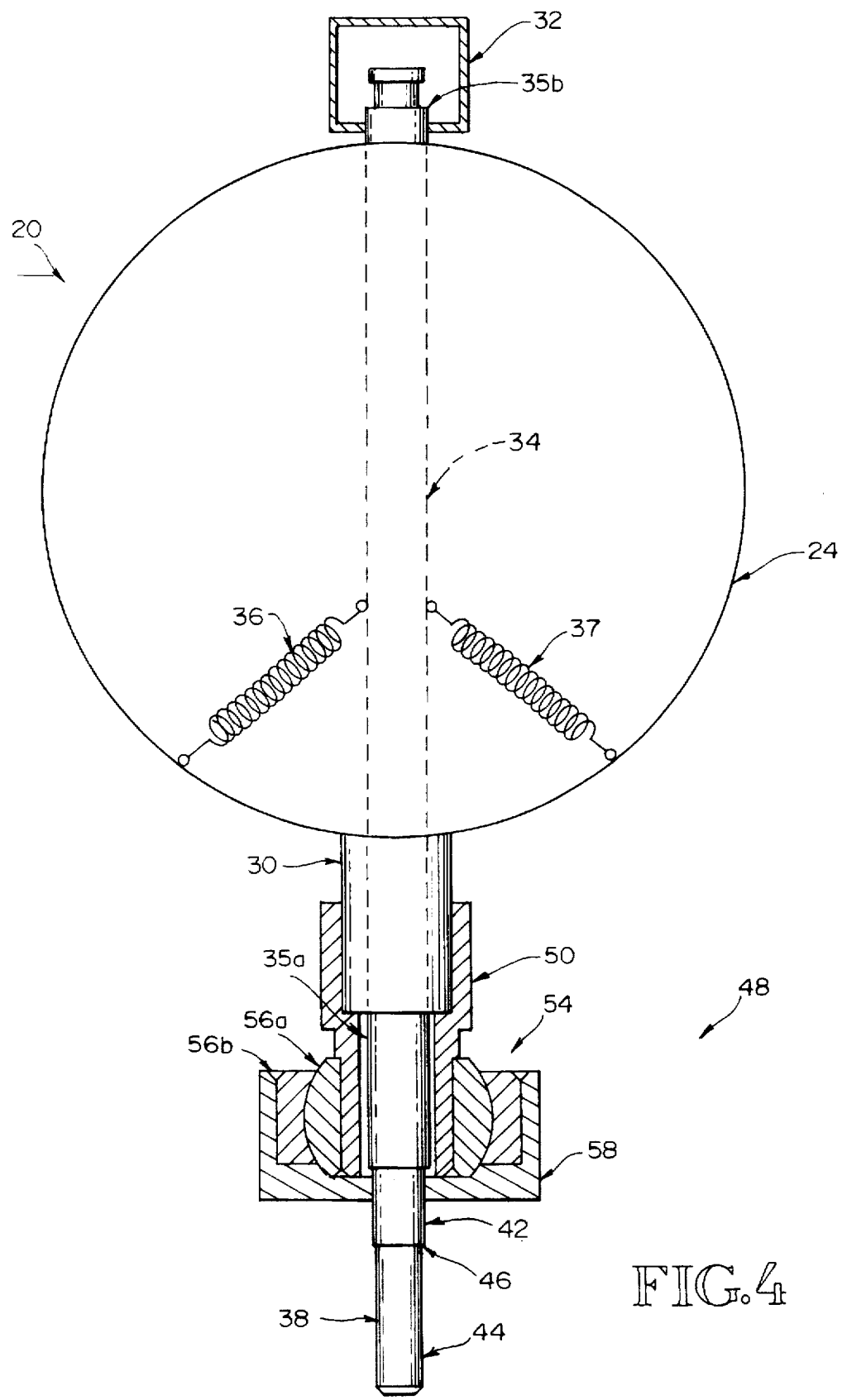
FIG. 4 is a cross-sectional view of the countersink depth gauge of the present invention.

FIG. 3 shows a countersink depth gauge 20 used to determine depth of a countersink in a hole that is not normal to a surface into which it was drilled. The gauge 20 includes a digital displacement indicator 22, such as a Mitutoyo Series 543 Digimatic indicator, for indicating the depth of the countersink. The indicator 22 includes an indicator head 24 having a digital readout 26, and three control buttons 28a, 28b, and 28c. The indicator head 24 also has a Statistical Process Control (SPC) output port (not shown). The displacement indicator 22, as shown in FIG. 4, further includes an indicator stem 30 and a quill 34, which is slideably engageable with the indicator stem 30, and which is centered about the centerline of the gauge 20. The quill 34 has a bottom end 35a and a top end 35b. The displacement indicator 22 also has a removable quill cap 32, which can be removed to allow application of finger pressure to the quill top end 35b. Finally, the indicator 22 includes a spring 36, which is coupled to an internal portion of the indicator head 24 and to the quill 34 to provide an opposing force to any compression of the quill 34 into the stem 30. Preferably, as shown in FIG. 4, an additional spring 37 is added between the head 24 and the quill 34 to increase the force exerted by the quill 34.

Figure 5:
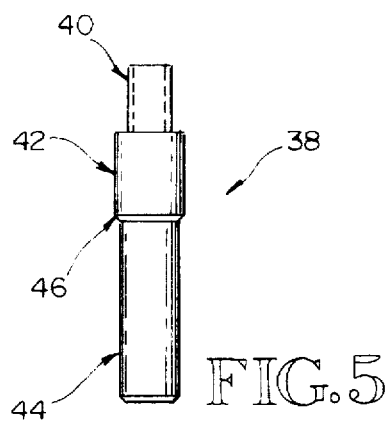
FIG. 5 is a side view of an extension pin of the countersink depth gauge.

As shown in FIG. 4, the quill 34 is extended along the centerline of the gauge by coupling an extension pin 38 to the bottom end 35a of the quill 34. The extension pin 38, as shown in FIG. 5, includes three sections, a threaded section 40, a shoulder section 42, and an insert section 44. The threaded section 40 has a plurality of male threads that are rotatably engaged with female counterpart threads in an orifice (not shown) within the bottom end 35a of the quill 34. The threaded section 40 allows the easy exchange of extension pins each sized for a particular hole. The insert section 44 is designed to be inserted into a hole having a countersink to be measured. Preferably, the diameter of the insert section 44 approximately equals the diameter of the hole to allow for the snug engagement of the insert 44 into the hole. The snug fit ensures that the centerline of the gauge 20 matches the centerline of the hole. The shoulder section 42 is sized to prevent insertion into the hole. Preferably, an edge or shoulder 46 of the shoulder section 42 is chamfered to match the angle of the countersink and is kept to a minimum diameter. This minimizes errors caused by countersink-to-hole centerline angle variations. The use of the insert 44 causes the gauge 20 to be aligned with the centerline of the hole. Further, the shoulder 46 stops any downward movement into the hole once it has made contact with the highest point 110 of the countersink (when countersink and hole are not axially aligned). Thus, countersink depth results will be conventionally measured (see background discussion above) regardless of axial alignment between the hole and the countersink.

Figure 1A:
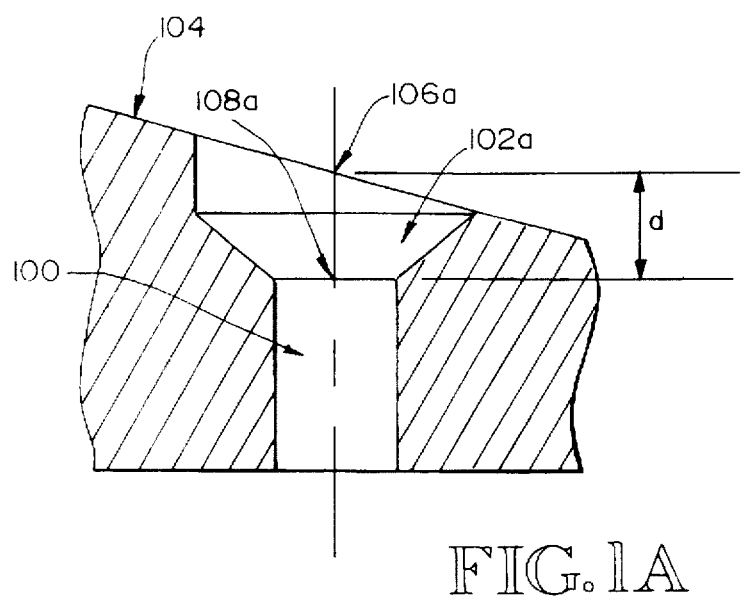
FIGS. 1A and 1B are cross sections of countersunk holes which are not normal to a surface.
Figure 1B:
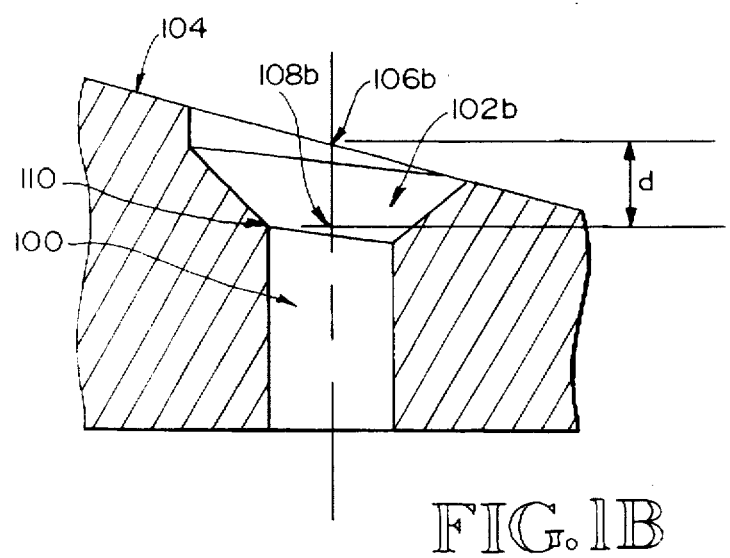
Figure 2A:
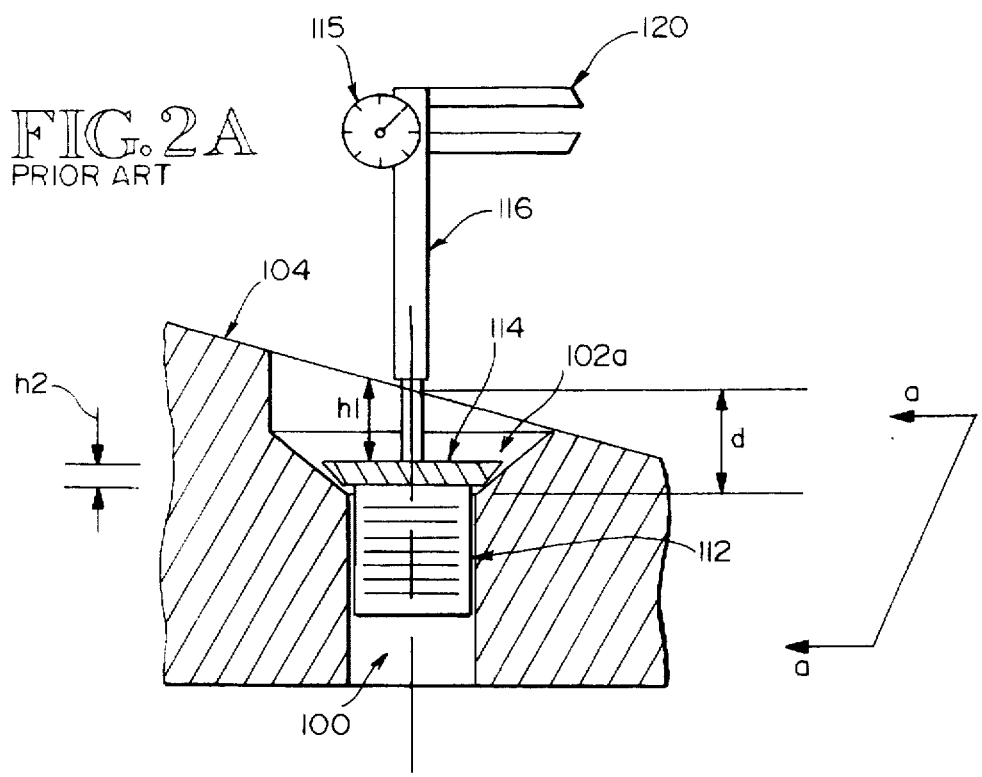
FIG. 2A shows a prior art method of measuring the depth of the countersink that is not normal to its surface.
Figure 2B:
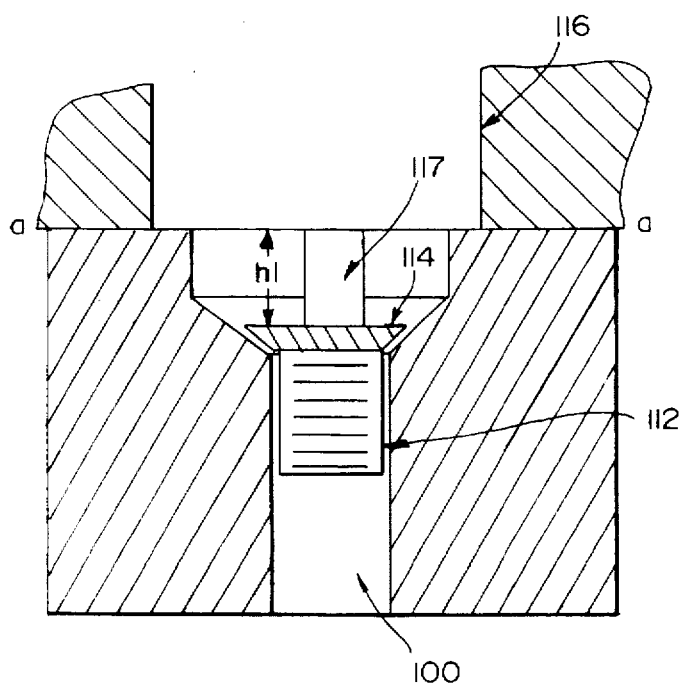
FIG. 2B shows the method of measuring the depth of the countersink along view a—a.
Figure 6:
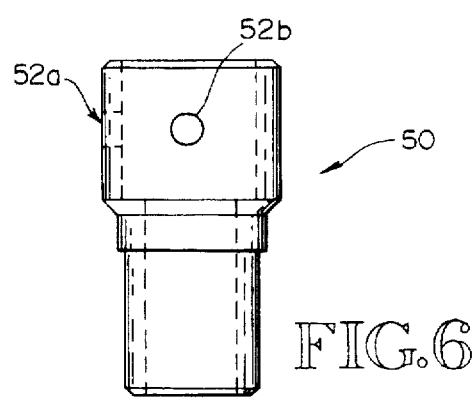
FIG. 6 is a cross-sectional view of a bearing mount of the countersink depth gauge.

As shown in FIGS. 3 and 4, the gauge 20 includes a bearing assembly 48 that properly and consistently aligns the gauge 20 with a planar surface. The assembly 35 includes a bearing mount 50, shown in FIG. 6, which is secured and aligned with the indicator stem 30 using set screws 52a and 52b. The assembly 48 also includes a spherical bearing 54, shown in FIG. 4, having a spherical component 56a, which is fixed to the bearing mount 50, and a concave component 56b, which is partially rotateable about the spherical component 56a. The spherical bearing 54 preferably has a low coefficient of rotational friction, and a slight preload between the spherical component 56a and the concave component 56b to eliminate free play. This is satisfied with a bearing such as a MS 14101-6⅛" Teflon lined spherical bearing. Finally, the concave component 56b is connected to an annular stand 58, whose height is calculated such that when the stand 58 makes contact with a surface in which a countersink is made, the gage 20 is repeatably indexed at a point where the centerline of the hole and the plane of the surface 104 meet, such as point 106a, shown in Figure 1a. Thus, the amount of displacement of the quill 34 registered by the gauge 20 indicates the actual distance between the surface and the measured bottom of the countersink.

In a preferred embodiment, the gauge 20 includes a finger piece 61, as shown in FIG. 3. The finger piece 61 is made of clear Lexan® and is designed to provide a user with an easy grip to hold the annular stand 58 firmly against the surface in which the countersink is formed.

Figure 7:
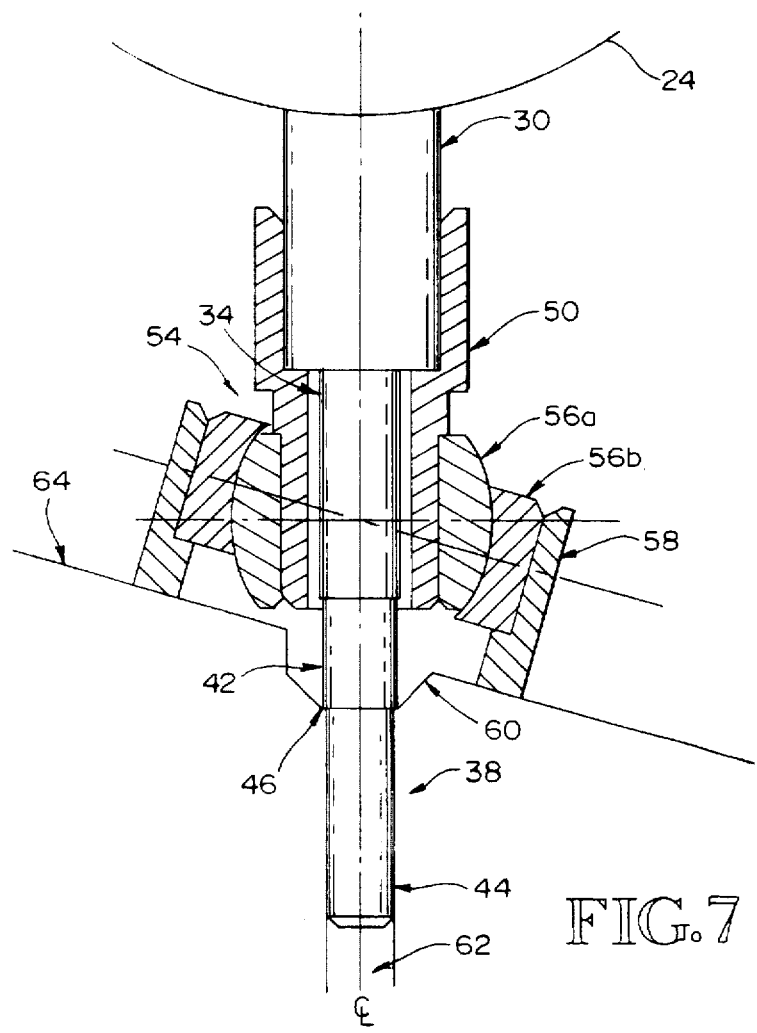
FIG. 7 shows the countersink depth gauge being used to measure the depth of a countersink in a hole which is not normal to a surface.

As shown in FIG. 7, the depth gauge 20 measures the depth of a countersink 60 for a hole 62 in a surface 64. Initially, the insert section 44 of the extension pin 38 is inserted into the hole 62. This places the centerline of the depth gauge 20 in axial alignment with the centerline of the hole 62. Movement of the extension pin 38 into the hole is stopped when the shoulder 46 of the extension pin 38 makes contact with a bottom of the countersink 60. Because the shoulder 36 is chamfered to match the angle of the countersink 60, the pin 38 will stop its movement in the hole 62 when it contacts the "highest" portion of the base of the countersink 60 ensuring accurate readings regardless of the variations in centerline between the hole 62 and the countersink 60.

Once the centerline of the gauge 20 has been properly aligned with the centerline of the hole 62 and the base of the countersink 60, the bearing assembly 48 is rotated until it is aligned with the plane of the surface 34. Then, the bearing assembly 48 is pushed toward the surface 64, causing movement of the quill 34 into the stem 30. The movement of the quill 34 stops when the annular stand 58 is firmly positioned on the surface 64, as shown in FIG. 7, and the accurate countersink depth reading is indicated on the digital readout 26, shown in FIG. 3.

The spherical bearing 54 allows the annular stand 58 to properly seat on the surface 64 accurately indicating the position of the surface 64 and its intersection with the centerline of the hole 62. Proper indication of the position of the surface 64 prevents the movement of the quill 34 from stopping before it contracts an amount equivalent to the total depth of the countersink 60. Thus, the spherical bearing 54 allows a center line of the depth gauge 20 to be precisely aligned with the longitudinal axis of the hole 62. This minimizes errors produced by hole-to-surface angle variations and by radial misalignments that would have occurred with a a hand held gauge having a fixed base.

Figure 8:
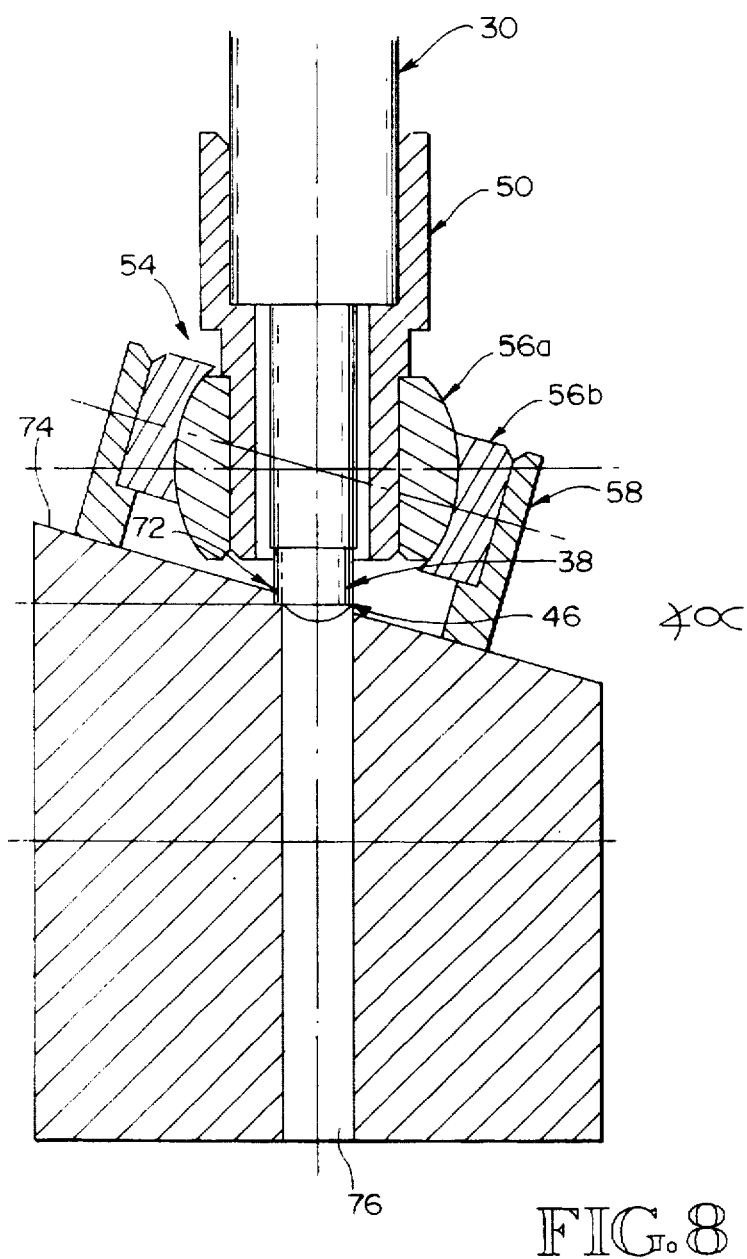
FIG. 8 shows the use of a calibration block to calibrate the countersink depth gauge.

In a preferred embodiment, as shown in FIG. 8, the gauge 20 is calibrated on a regular basis using a calibration block 70. A precisely bored countersink 72 is formed in the block 70. The depth of the countersink 72 is such that when a user pushes the extension pin 38 into the hole 76, the shoulder 46 seats in the countersink 72 placing the centerline of the shoulder 46 at the exact point where the centerline of the hole 76 meets the plane of surface 74. Once the gauge 20 has been pressed against the surface 74 so that the annular stand 58 is completely seated on the surface 74, the control button 28a on the indicator head 24, as shown in FIG. 3, is pressed causing the digital readout 26 to be zeroed. Preferably, the angle α between the hole 76 and the surface 74 on the calibration block 70 is the same as the angle between the surface and the hole having the countersink to be measured.

In conclusion, the countersink depth gauge 20 of the present invention uses a bearing assembly 48 and an extension pin 38 to accurately measure the depth of a countersink of a hole, even when the hole is not perpendicular to a surface in which is was drilled.

While the detailed description above has been expressed in terms of specific examples, those skilled in the art will appreciate that many other configurations could be used to accomplish the purpose of the disclosed inventive apparatus. Accordingly, it will be appreciated that various equivalent modifications of the above-described embodiments may be made without departing from the spirit and scope of the invention. Therefore, the invention is to be limited only by the following claims.

What is claimed is:

1. An alignment device used to align a displacement indicator, which has a main body and a displaceable member, with a countersink of a hole drilled into a surface that is not orthogonal to the hole, said alignment device comprising:

an extension member coupled to the displaceable member of the displacement indicator, said extension member sized to extend along a longitudinal axis of the displaceable member and to align a centerline of the hole with a centerline of the displaceable member, said extension member having an insert section having a diameter less than a diameter of the hole and a shoulder section extending along a longitudinal axis of said insert section from a transition edge and having a diameter grater than a base of the countersink; and a swivel assembly having a fixed portion coupled to the main body of the displacement indicator and a base in rotational engagement with the fixed portion ensuring that the displaceable member is properly displaced with respect to the surface.

2. The alignment device according to claim 1 wherein the diameter of said insert section is approximately equal to the diameter of the hole to ensure a centerline of said extension member lies along the centerline of the hole.

3. The alignment device according to claim 1 wherein the transition edge of said shoulder section is chamfered at an angle equal to an angle of the countersink.

4. The alignment device according to claim 1 wherein said swivel assembly includes a spherical bearing having a spherical section and a concave section, and wherein said spherical section is coupled to the fixed portion of said swivel assembly.

5. The alignment device according to claim 4 wherein the base of said swivel assembly includes an annular stand having a bottom end and an inner side, the inner side of said annular stand being coupled to the concave section of said spherical bearing.

6. The alignment device according to claim 5, further comprising a finger piece coupled to said swivel assembly and contoured to allow a user to position the bottom end of said annular stand on the surface.

7. A method of measuring depth of a countersink in a hole, which is drilled into a surface at an angle that is not normal to the surface, with a displacement indicator having a displaceable member attached to an extension member, which has an insert section with a diameter less than a diameter of the hole and a shoulder section with a diameter greater than a diameter of the hole, the displacement indicator being mounted on a swivel assembly having a fixed portion and a base, said method comprising the steps of:

inserting the insert section of the extension member into the hole until the shoulder section makes contact with a base of the countersink to align a centerline of the hole with a centerline of the displaceable member;

rotating the swivel assembly to align the base with the surface; and compressing the displacement indicator until the base makes complete contact with the surface to ensure that a distance of compression of the displaceable member equals a distance between the base of the countersink and the surface measured along the centerline of the hole.

8. An apparatus for measuring a countersink in a hole that is drilled into a surface at an angle that is not normal to the surface, said apparatus comprising:

an extension pin including:
  an insert section having a diameter less than a diameter of the hole, wherein the diameter of said insert section closely approximates the diameter of the hole;
  a shoulder section contiguous with said insert section at a transition edge, said shoulder section having a diameter greater than the diameter of the hole and less than the diameter of a base of the countersink, the transition edge being chamfered at an angle equal to an angle of the countersink; and
  an engagement section having an end contiguous with said shoulder section and a threaded end opposite the end contiguous with said shoulder section;

a displacement indicator including:
  a quill having a first end with a threaded orifice for coupling with the threaded end of said shoulder section, and a second end;
  a stem having a diameter larger than a diameter of said quill, said stem receiving and slideably engageable with the second end of said quill; and
  an indicator head coupled to said stem and having a display indicative of an amount of displacement of said quill into said stem;

a bearing assembly including:
  a bearing mount removably coupled to and alignable with said stem of said displacement indicator;
  a spherical bearing having a spherical section and a concave section rotatably engageable with said spherical section, said spherical section of said spherical bearing being coupled to said bearing mount; and
  an annular stand having a bottom end and an inner side, the inner side of said annular stand being coupled to the concave section of said spherical bearing; and a finger piece coupled to said bearing assembly, and contoured to allow a user to position the bottom end of said annular stand on the surface.

* * * * *